US008132286B2

(12) United States Patent
Chiappetta et al.

(10) Patent No.: US 8,132,286 B2

(45) Date of Patent: Mar. 13, 2012

(54) STRING CLEANING SYSTEM

(75) Inventors: David Chiappetta, Brooklyn, NY (US); John Byrne, Lake Villa, IL (US); Agjah Libohova, Westbury, NY (US)

(73) Assignee: David Chiappetta, Brooklyn, NY (US)

( * ) Notice: Subject to any disclaimer, the term of this patent is extended or adjusted under 35 U.S.C. 154(b) by 570 days.

(21) Appl. No.: 12/129,169

(22) Filed: May 29, 2008

(65) Prior Publication Data

US 2009/0107525 A1 Apr. 30, 2009

Related U.S. Application Data

(60) Provisional application No. 60/982,545, filed on Oct. 25, 2007.

(51) Int. Cl.
*G01D 3/00* (2006.01)

(52) U.S. Cl. .......... 15/220.4; 15/210.1; 84/453; 401/10; 24/518; 24/543

(58) Field of Classification Search ............... 15/104.94, 15/118, 210.1, 214, 218, 218.1, 220.3, 220.4; 84/453; 401/10; 24/518, 543, 487, 505
See application file for complete search history.

(56) References Cited

U.S. PATENT DOCUMENTS 652,520 A 6/1900 Pletcher
723,463 A * 3/1903 Heywood ..................... 15/218.1
1,096,354 A * 5/1914 Coyle .......................... 15/218.1
1,748,900 A 2/1930 Pilla
1,951,079 A 3/1934 Zihlman (Continued)

FOREIGN PATENT DOCUMENTS

DE 30 03 402 A1 6/1981

OTHER PUBLICATIONS

String Clean Ltd., "The Swipe 'Guitar String Cleaner'", [Retrieved Sep. 6, 2004], Retrieved from Internet: URL: <http://www.stringclean.com/>. 1pg.

(Continued)

*Primary Examiner* — Mark Spisich

(74) *Attorney, Agent, or Firm* — Buckley, Maschoff & Talwalkar LLC

(57) ABSTRACT

An apparatus may include a first support, a first cleaning material coupled to a first side of the first support, a second support rotatably coupled to the first support at a first edge of the second support, the second support defining a first opening disposed adjacent to a second edge of the second support opposite the first edge, a second cleaning material coupled to a first side of the second support, and a latch coupled to the first support, the latch to engage the first opening of the second support to maintain the first side of the first support in a substantially fixed relationship with respect to the first side of the second support.

Some aspects include placing a second support between a musical instrument and a string coupled to the musical instrument, the second support defining a first opening disposed adjacent to a first edge of the second support, rotating a first support with respect to the second support to dispose the string between the first support and the second support, the first support coupled to a second edge of the second support opposite the first edge, and engaging a latch coupled to the first support with the first opening of the second support to maintain the first support in a substantially fixed relationship with respect to the second support.

10 Claims, 8 Drawing Sheets

U.S. PATENT DOCUMENTS

| | | | | | |
|---|---|---|---|---|---|
| 2,148,009 | A | | 2/1939 | Bing | |
| 2,215,139 | A | * | 9/1940 | Uhlmann | 24/543 |
| 2,301,243 | A | | 11/1942 | Binkley | |
| 2,334,170 | A | | 11/1943 | Bjorkman | |
| 2,715,291 | A | | 8/1955 | Sweigert | |
| 2,775,013 | A | | 12/1956 | Pedrero | |
| D180,034 | S | | 4/1957 | Robertson | |
| 2,791,330 | A | | 5/1957 | Carlson | |
| 2,819,484 | A | | 1/1958 | Fouse | |
| D188,356 | S | | 7/1960 | Hertzler | |
| 2,977,127 | A | | 3/1961 | Mertes | |
| 3,445,880 | A | | 5/1969 | Warner | |
| 3,791,330 | A | | 2/1974 | Haddad | |
| 3,971,287 | A | | 7/1976 | Ito | |
| 4,112,808 | A | | 9/1978 | Ketterer | |
| 4,480,352 | A | | 11/1984 | Eggett | |
| 4,525,411 | A | | 6/1985 | Schmidt | |
| 4,528,889 | A | | 7/1985 | Gentile, Jr. | |
| 4,539,228 | A | | 9/1985 | Lazarus | |
| 4,571,787 | A | * | 2/1986 | Furutsu | 24/543 |
| 4,897,900 | A | * | 2/1990 | Baggett | 24/543 |
| 4,947,476 | A | | 8/1990 | Seaburg | |
| 4,972,543 | A | | 11/1990 | Michaels | |
| 5,050,272 | A | * | 9/1991 | Robinson et al. | 24/30.5 R |
| D329,374 | S | | 9/1992 | Kaga | |
| 5,226,892 | A | * | 7/1993 | Boswell | 604/180 |
| D350,232 | S | | 9/1994 | Stangarone et al. | |
| 5,423,831 | A | * | 6/1995 | Nates | 606/120 |
| D365,425 | S | | 12/1995 | Breshears | |
| D367,744 | S | | 3/1996 | White | |
| 5,569,863 | A | | 10/1996 | Lem | |
| D384,459 | S | | 9/1997 | Eisenman | |
| 5,674,084 | A | | 10/1997 | Fukamachi | |
| D428,224 | S | | 7/2000 | Alexander | |
| 6,401,922 | B1 | | 6/2002 | Svetlik | |
| 6,446,638 | B1 | | 9/2002 | Horman | |
| 7,005,035 | B2 | | 2/2006 | O'Neill et al. | |
| D563,067 | S | | 2/2008 | Byrne et al. | |
| 2005/0066794 | A1 | | 3/2005 | Beerbohm | |
| 2005/0145096 | A1 | | 7/2005 | Kalousek | |
| 2006/0048793 | A1 | | 3/2006 | Chiappetta | |

OTHER PUBLICATIONS

"GHS Fast Fret—SameDayMusic.com". [Retrieved Sep. 6, 2004]. Retrieved from Internet URL: <http://www.samedaymusic.com/product—GHSMSFF>. 2pgs.

"PCT International Search Report of the International Searching Authority", mailed Jun. 22, 2006, for PCT/US05/31768, 3pgs.

"PCT International Search Report of the International Searching Authority", mailed Nov. 14, for PCT/US08/76370, 3pgs.

* cited by examiner

STRING CLEANING SYSTEM

CROSS REFERENCE TO RELATED APPLICATIONS

This application claims priority to U.S. Provisional Patent Application Ser. No. 60/982,545, filed Oct. 25, 2007 and entitled "String Cleaning System", the contents of which are incorporated by reference herein for all purposes.

BACKGROUND

1. Field

The present specification relates generally to string cleaning systems. More specifically, some embodiments described herein may relate to the cleaning of musical instrument strings.

2. Description of Related Art

Many types of musical instruments use strings to generate sound. Musical instrument strings may consist of nylon, steel, intestinal material (i.e., "gut"), or any other suitable materials. A string may collect debris on its surface and in its microscopic pores, which reduces the quality of sound generated thereby and may increase the possibility of breakage. This debris may consist, for example, of dust from the surrounding air or oil, dirt and sweat from a musician's fingers. Steel strings may also collect rust simply due to their exposure to air. "Wound" strings, which consist of one or more strings wrapped around a core of one or more other strings, are particularly susceptible to collecting debris. Wound strings are also more difficult to clean than unwound strings.

Several string cleaning techniques are known. One such technique, exemplified by U.S. Pat. No. 4,112,808, involves removing a wound string from an instrument, wrapping the string around one or more rollers, and moving the string back and forth along the rollers to dislodge dirt within the string. Other techniques do not require removal of the string from the instrument. Such techniques include devices for surrounding one or more strings with a cloth (e.g., U.S. Pat. No. 4,528,889) or with cleaning pads (e.g., German Publication DE 3003402A1) and moving the cloth or pads relative to the strings.

All conventional string cleaning techniques pose one or more problems. Some are extremely inefficient and time-consuming, such as that described in U.S. Pat. No. 4,112,808. The devices mentioned above may provide insufficient pressure on the strings, present difficulties in placing the cloth or pad between the strings and the instrument, fail to securely maintain the cloth or pad around the strings, and/or include elements that skew or twist during use. What is needed is a system to address one or more of the foregoing shortcomings.

SUMMARY

Some embodiments may address the foregoing by providing an apparatus including a first support, a first cleaning material coupled to a first side of the first support, and a second support rotatably coupled to the first support at a first edge of the second support, wherein the second support defines a first opening disposed adjacent to a second edge of the second support opposite the first edge. The apparatus may also include a second cleaning material coupled to a first side of the second support, and a latch coupled to the first support, the latch to engage the first opening of the second support to maintain the first side of the first support in a substantially fixed relationship with respect to the first side of the second support.

The latch may be integral with the first support and/or may include a release element to compress the latch and to allow the compressed latch to disengage from the first opening. The release element, in some aspects, extends past a second side of the first support. Further aspects include a projection on the latch to pass through the first opening and to engage a second side of the second support. Aspects may include a first stop coupled to the first side of first support to engage the first side of the second support in a case that the latch engages the first opening of the second support.

In other aspects, a second support is placed between a musical instrument and a string coupled to the musical instrument. The second support defines a first opening disposed adjacent to a first edge of the second support. A first support coupled to a second edge of the second support opposite the first edge is rotated with respect to the second support to dispose the string between the first support and the second support. A latch coupled to the first support is engaged with the first opening of the second support to maintain the first support in a substantially fixed relationship with respect to the second support.

Moreover, a release element extending past a second side of the first support may be pressed to compress the latch, and the first support may be rotated away from the second support while pressing the release element to disengage the latch from the first opening.

The claims are not limited to the disclosed embodiments, however, as those in the art can readily adapt the teachings herein to create other embodiments and applications.

BRIEF DESCRIPTION OF THE DRAWINGS

Embodiments will become readily apparent from consideration of the following specification as illustrated in the accompanying drawings, in which like reference numerals designate like parts, and wherein.

DETAILED DESCRIPTION

The following description is provided to enable any person in the art to make and use the described embodiments and sets forth the best mode contemplated by the inventors for carrying out the described embodiments. Various modifications, however, will remain readily apparent to those in the art.

Figure 1:
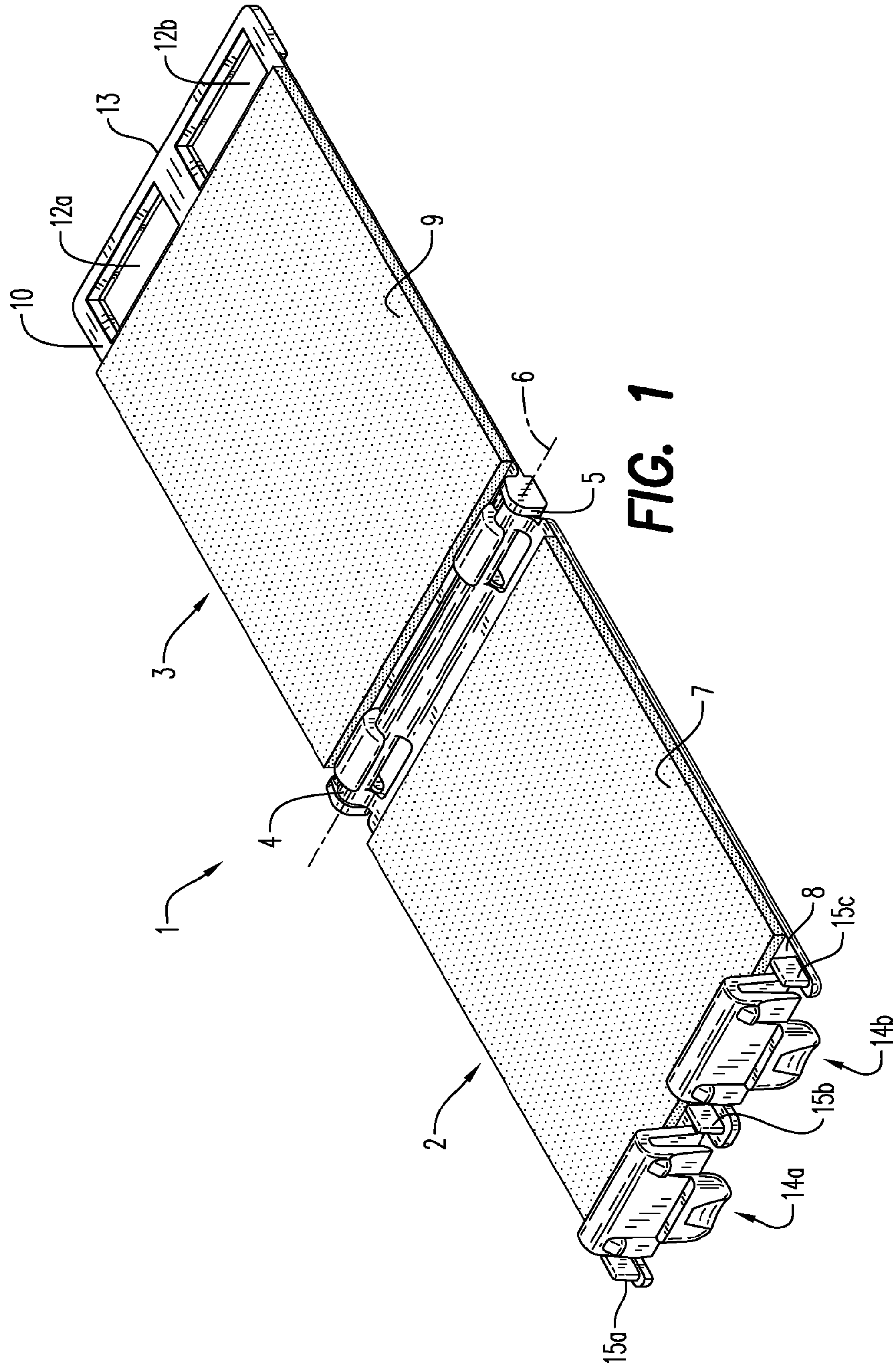
FIG. 1 is a top perspective view of a string cleaning apparatus according to some embodiments.

FIG. 1 is a perspective view of apparatus 1 according to some embodiments. Apparatus 1 may comprise an apparatus to clean strings, including but not limited to guitar strings, bass guitar strings, banjo strings, and mandolin strings. Apparatus 1 may also or alternatively be used to clean piano strings, harp strings, or any other suitable string of any composition that is or becomes known. The verb "clean" as used herein does not necessarily denote removal of all foreign substances from a string, but encompasses actions that attempt to remove some amount of debris.

Apparatus 1 includes first support 2 and second support 3, which are rotatably coupled to one another. That is, edge 4 of first support 2 and edge 5 of second support 3 include features for coupling first support 2 to second support 3 and enabling at least partial rotation about axis 6. Any suitable features may be employed for these functions in some embodiments, including but not limited to an integral (i.e., "living") hinge.

First cleaning material 7 is coupled to first side 8 of first support 2, and second cleaning material 9 coupled to first side 10 of second support 3. First cleaning material 7 and second cleaning material 9 may be coupled to their respective support using any suitable adhesive (e.g., glue) or fastener (e.g., thread stitches). First cleaning material 7 and second cleaning material 9 may be composed of different or substantially identical materials. Any currently- or hereafter-known material may be used for first cleaning material 7 and second cleaning material 9. The compositions of first cleaning material 7 and second cleaning material 9 may be particularly suited to cleaning particular types of string material. For example, first cleaning material 7 and second cleaning material 9 may be suited for cleaning steel.

In some embodiments, first cleaning material 7 and second cleaning material 9 comprise microfiber material. Microfiber material may comprise fibers of 0.9 denier or finer. Some microfiber material utilizes polyester fibers for scrubbing properties and polymide fibers for absorbing and drying properties. The fibers are woven into a fabric that may include thousands of loops per square inch. The loops may dislodge small particles from small crevices and trap the particles within the weave. The loops may hold and distribute a cleaning solution in some embodiments. In some embodiments, second cleaning material 9 is between 0.075 in. and 0.125 in. thick. Such a thickness may facilitate passage of material 9 and second support 3 between a string and an instrument while still providing sufficient height for the loops of material 9 to contact sides of the string.

Figure 2:
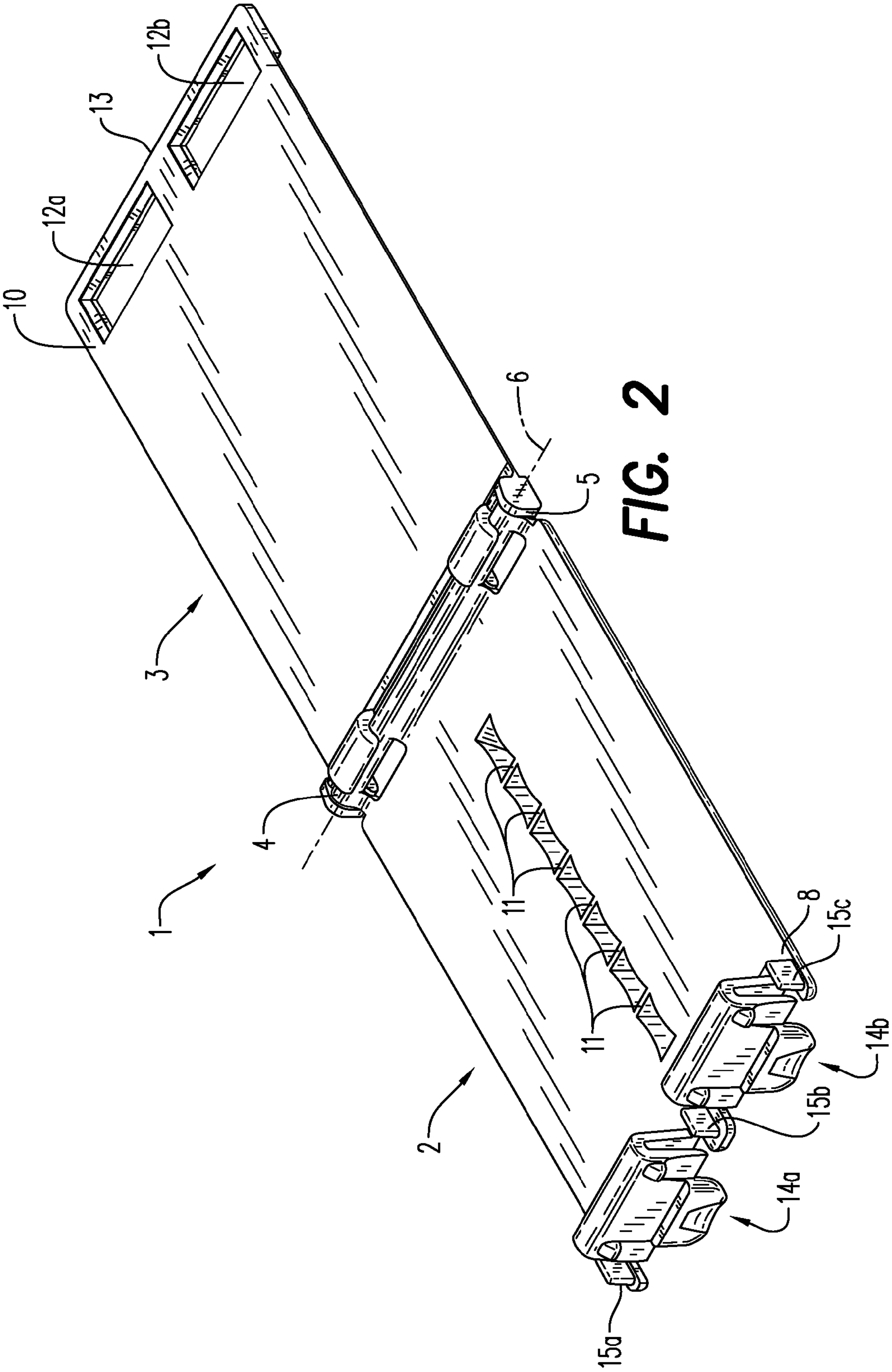
FIG. 2 is a top perspective view of a string cleaning apparatus according to some embodiments.

FIG. 2 is a top perspective view of apparatus 1 without first cleaning material 7 or second cleaning material 9. FIG. 2 shows first side 8 to which first cleaning material 7 will be coupled and first side 10 to which first cleaning material 9 will be coupled. Also shown are anti-skew ribs 11 defined by first support 2. Anti-skew ribs 11 may reduce a tendency of first support 2 and/or a handle coupled thereto to skew during use as will be described below. Some embodiments do not include anti-skew ribs 11.

FIGS. 1 and 2 also show openings 12*a* and 12*b* defined by second support 3. Openings 12*a* and 12*b* are shown adjacent to edge 13 of support 3. Latches 14*a* and 14*b* may engage openings 12*a* and 12*b* according to some embodiments as will also be described below. Generally, engagement of openings 12*a* and 12*b* by latches 14*a* and 14*b* may maintain first side 8 of support 2 in a substantially fixed relationship with first side 10 of second support 3. Moreover, in some embodiments, the relationship is securely maintained during use.

Stops 15*a* through 15*c* are coupled to first side 8 of support 2. Stops 15*a* through 15*c* may engage (i.e., touch) first side 10 of second support 3 when latches 14*a* and 14*b* engage openings 12*a* and 12*b*. Stops 15*a* through 15*c* may thereby assist in maintaining a minimum spacing between first side 8 and first side 10 during use.

Figure 3:
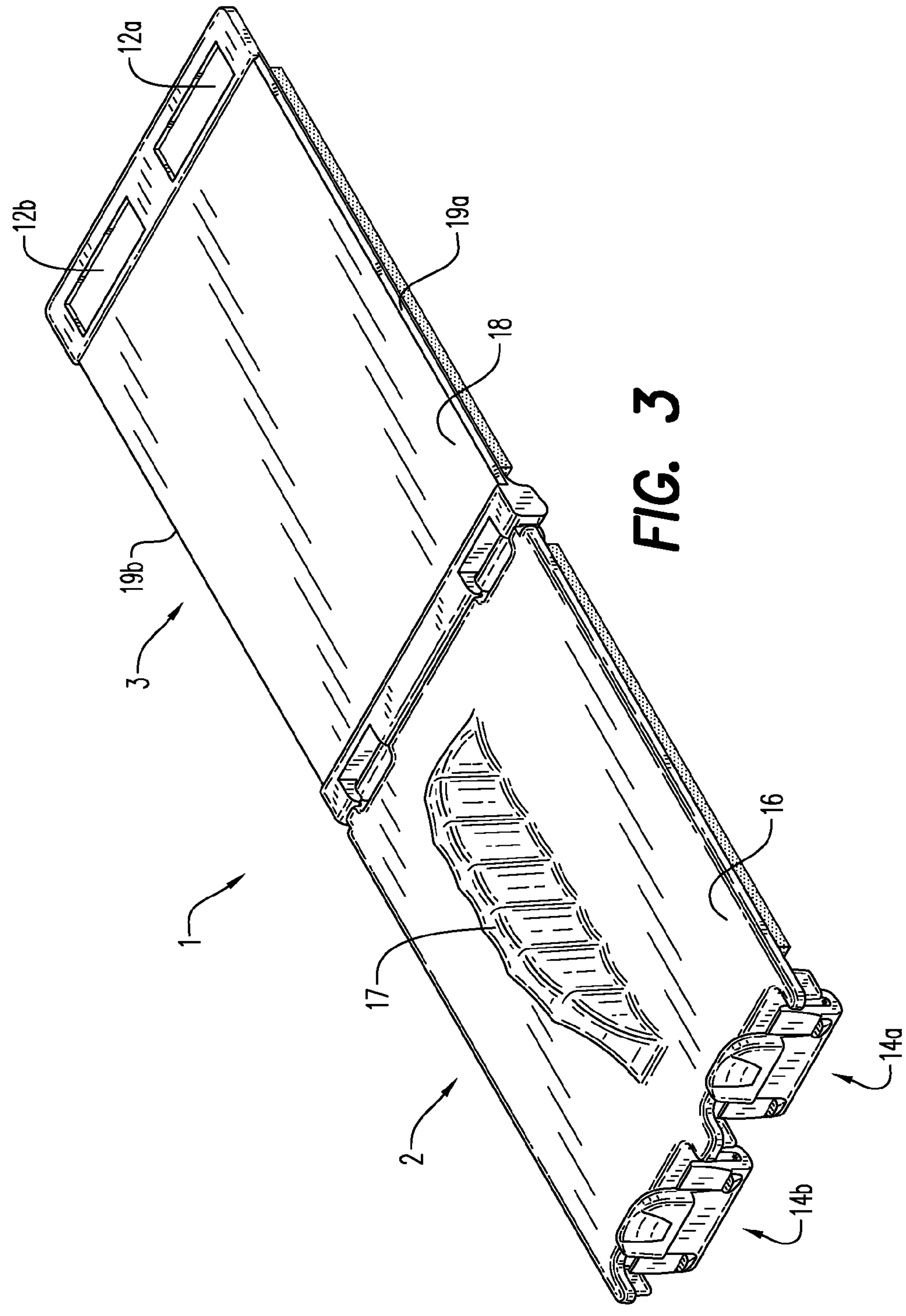
FIG. 3 is a bottom perspective view of a string cleaning apparatus according to some embodiments.

FIG. 3 is a bottom perspective view of apparatus 1 according to some embodiments. First support 2 includes second side 16 to which handle 17 is coupled. Handle 17 may be integral with second side 16 or attached thereto in any manner. In some embodiments, handle 17 may exhibit a size, shape, and/or orientation different from that depicted in FIG. 3.

Second support 3 includes second side 18 and beveled edges 19*a* and 19*b* (not shown). Beveled edges 19*a* and 19*b* may facilitate moving second support 3 between a string and another object located proximate to the string, such as a fingerboard or a fret. For example, beveled edges 19*a* and 19*b* may allow second side 18 to "ride" over frets disposed on a neck of a musical instrument. In some embodiments that may be suitable for cleaning guitar strings, second support 3 may be 0.040 in thick and a thinnest portion of beveled edges 19*a* and 19*b* may be 0.007 in thick. Such an arrangement may allow second support 3 to be placed between a string and an instrument neck (or other structure) even if the string and neck are located particularly close to one another (e.g., close to an instrument "nut").

Figure 4:
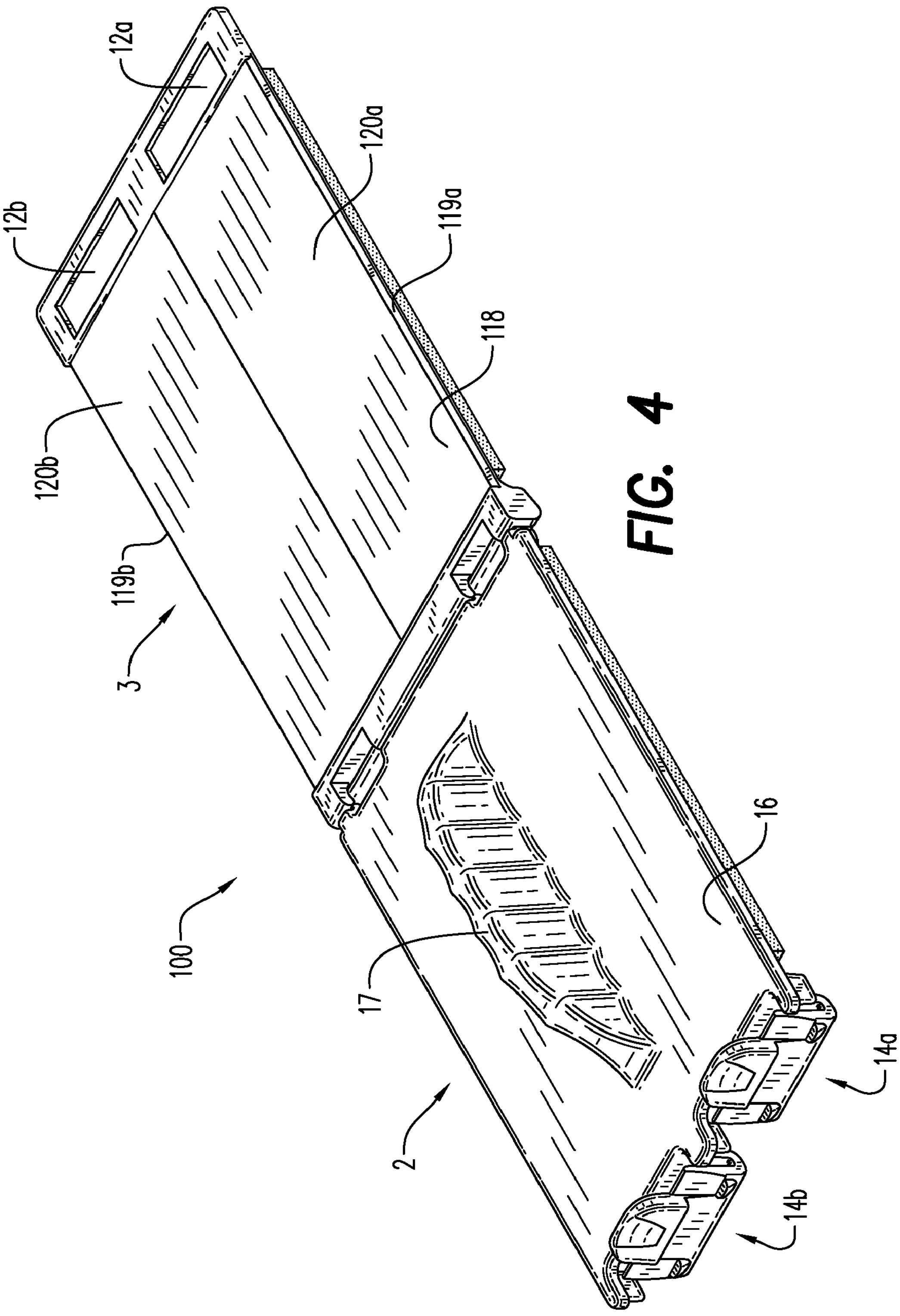
FIG. 4 is a bottom perspective view of a string cleaning apparatus according to some embodiments.

FIG. 4 illustrates apparatus 100 including additional features which may facilitate the movement described above. Specifically, second side 118 of second support 3 includes bevel 120*a* extending from beveled edge 119*a* to a central portion of second side 118 and bevel 120*b* extending from beveled edge 119*b* to the central portion. Bevels 120*a* and 120*b* may further improve an ability of apparatus 100 to "ride" over encountered frets.

Second support 3 exhibits a low profile in some embodiments. This profile facilitates passage of second support 3 between a string and any adjacent structure. As shown in FIGS. 3 and 4, a portion of second support 3 which defines openings 12*a* and 12*b* may be thicker than a portion of support 3 to which material 9 is coupled. Such an arrangement may provide sufficient rigidity around openings 12*a* and 12*b* and sufficiently thin profile for passing between a string and an instrument during cleaning.

Figure 5:
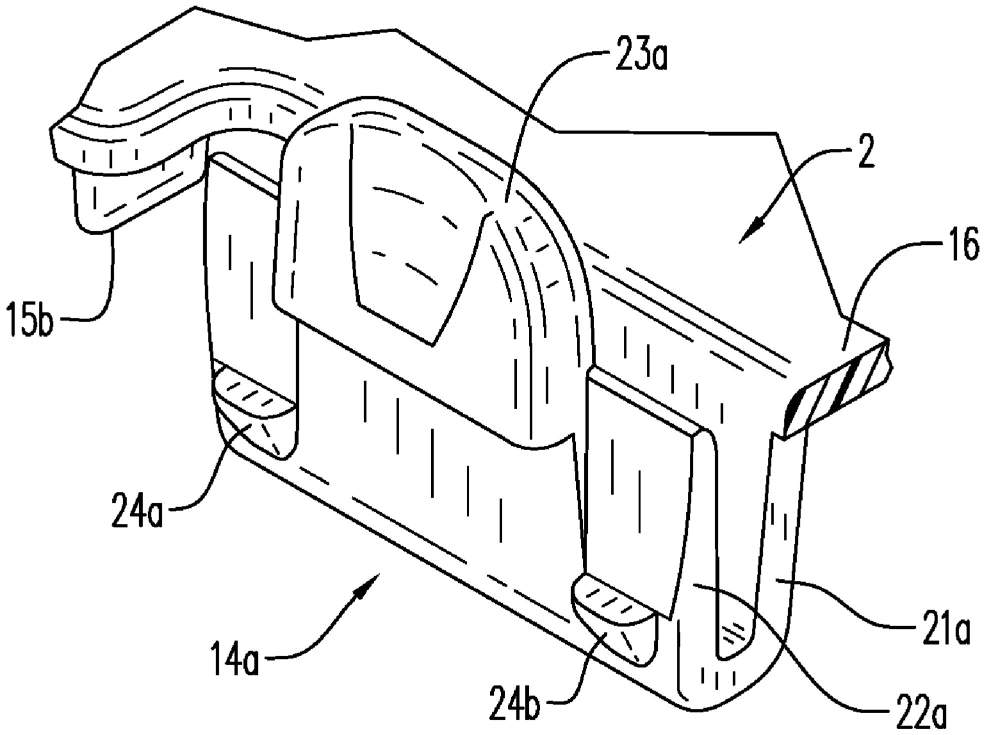
FIG. 5 is a close-up perspective view of a latch according to some embodiments.

FIG. 5 is a close-up perspective view to describe latch 14*a* according to some embodiments. Latch 14*a* of FIG. 5 is integral with first support 2 and includes first leg 21*a*, second leg 22*a*, release element 23*a*, and projections 24*a* and 24*b*. Release element 23*a* extends above second side 16 of support 2. Such a feature may provide efficient separation of latch 14*a* from corresponding opening 12*a* in some embodiments.

Projections 24*a* and 24*b* may pass through opening 12*a* and engage second side 18 of second support 3 as will be described below. Projections 24*a* and 24*b* may therefore resist movement of first support 2 away from second support 3 and/or assist in maintaining the above-mentioned fixed relationship between first side 8 and second side 10.

Some embodiments allow molding of first support 2, latches 14*a* and 14*b*, stops 15*a* through 15*c*, and handle 17 as a single integral piece. Second support 3 may also or alternatively be molded as a single integral piece. A thickness and/or composition of second support 3 may differ from a thickness and/or composition of first support 2. For example, a composition of second support 3 may be denser than that of first support 2 to allow for a reduced thickness of support 3 while still providing suitable resistance to twist and skew. The reduced thickness may facilitate passage of second support 3 between a string and an instrument.

In some embodiments, latches 14*a* and 14*b* might not be integral with first support 2, and/or the design of latches 14*a* and 14*b* may differ from that illustrated and described. A number, design and placement of stops 15*a* through 15*c* may differ, as could a number, design and placement of openings 12*a* and 12*b*. Embodiments are not limited to the configurations of FIGS. 1 through 5 and the alternatives described herein.

Figure 6:
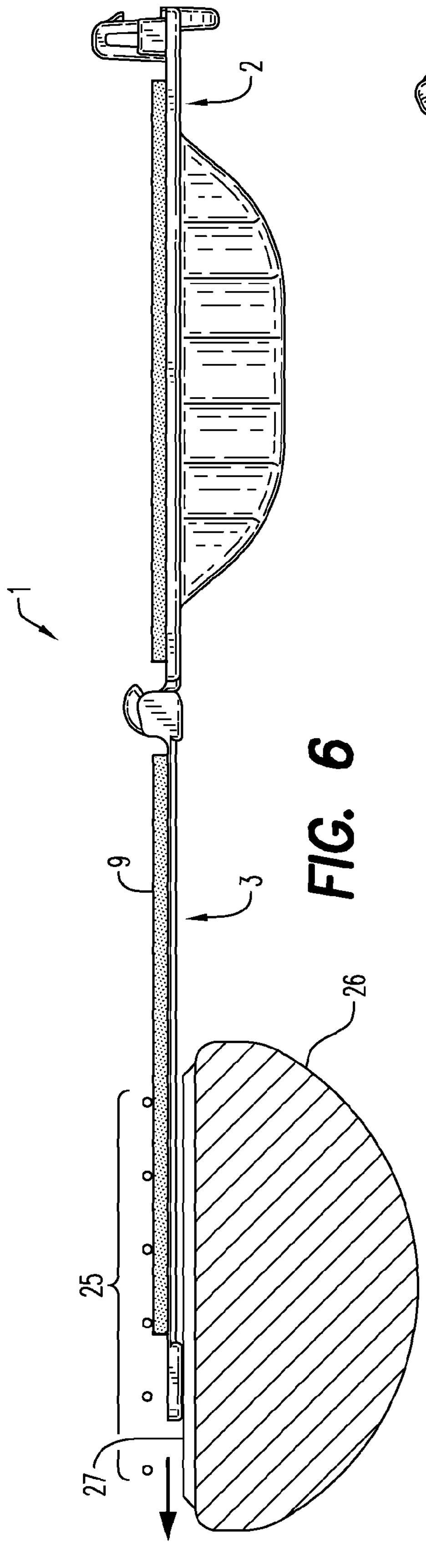
FIG. 6 is a side elevational view of a string cleaning apparatus during use according to some embodiments.

FIGS. 6 through 9 illustrate usage of apparatus 1 according to some embodiments. As shown in FIG. 6, second support 3 may be moved between strings 25 and instrument neck 26 while apparatus 1 is in an "open" position. Strings 25 may comprise any strings to be cleaned according to some embodiments. Strings 25 may comprise a combination of different types of strings (e.g., wound and unwound) having different compositions (e.g., steel and nylon) and different diameters.

Fret 27 is shown coupled to instrument neck 26, but usage is not limited to fretted instruments. A combined thickness of second support 3 and cleaning material 9 may be suitable for passage between strings 25 and fret 27. According to some embodiments, a thickness of cleaning material 9 when uncompressed is substantially 0.100 in. and a thickness of support 3 where coupled to cleaning material 9 is substantially 0.040 in.

Figure 7:
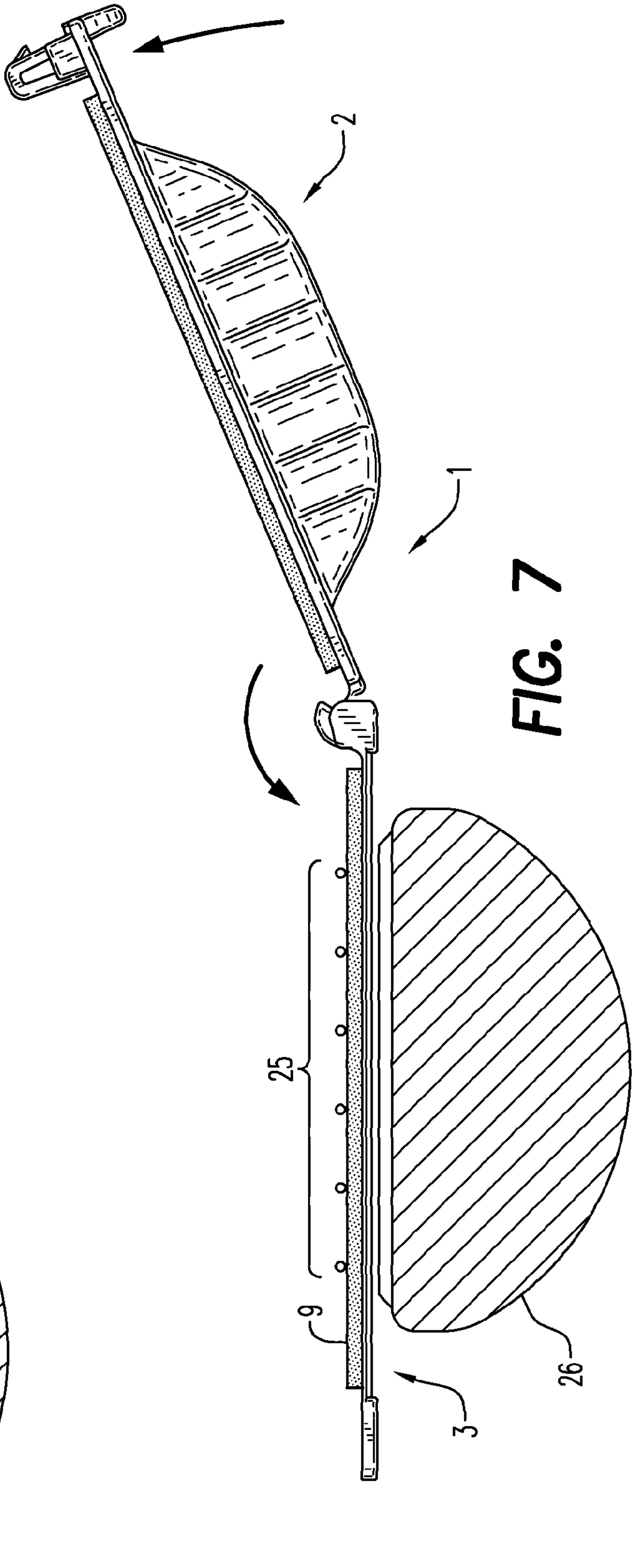
FIG. 7 is a side elevational view of a string cleaning apparatus during use according to some embodiments.

FIG. 7 shows cleaning material 9 disposed between each of strings 25 and instrument neck 26. First support 2 is being rotated in the direction of the illustrated arrows toward second support 3. Although it may be easier to move first support 2 while second support 3 remains substantially stationary, the movement shown in FIG. 7 is relative movement which may include movement of either one or both of the first support 2 and second support 3.

Figure 8:
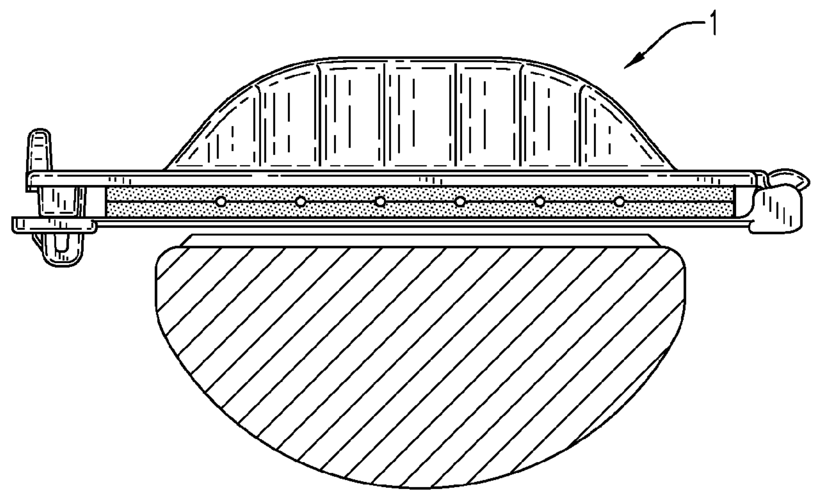
FIG. 8 is a side elevational view of a string cleaning apparatus during use according to some embodiments.
Figure 9:
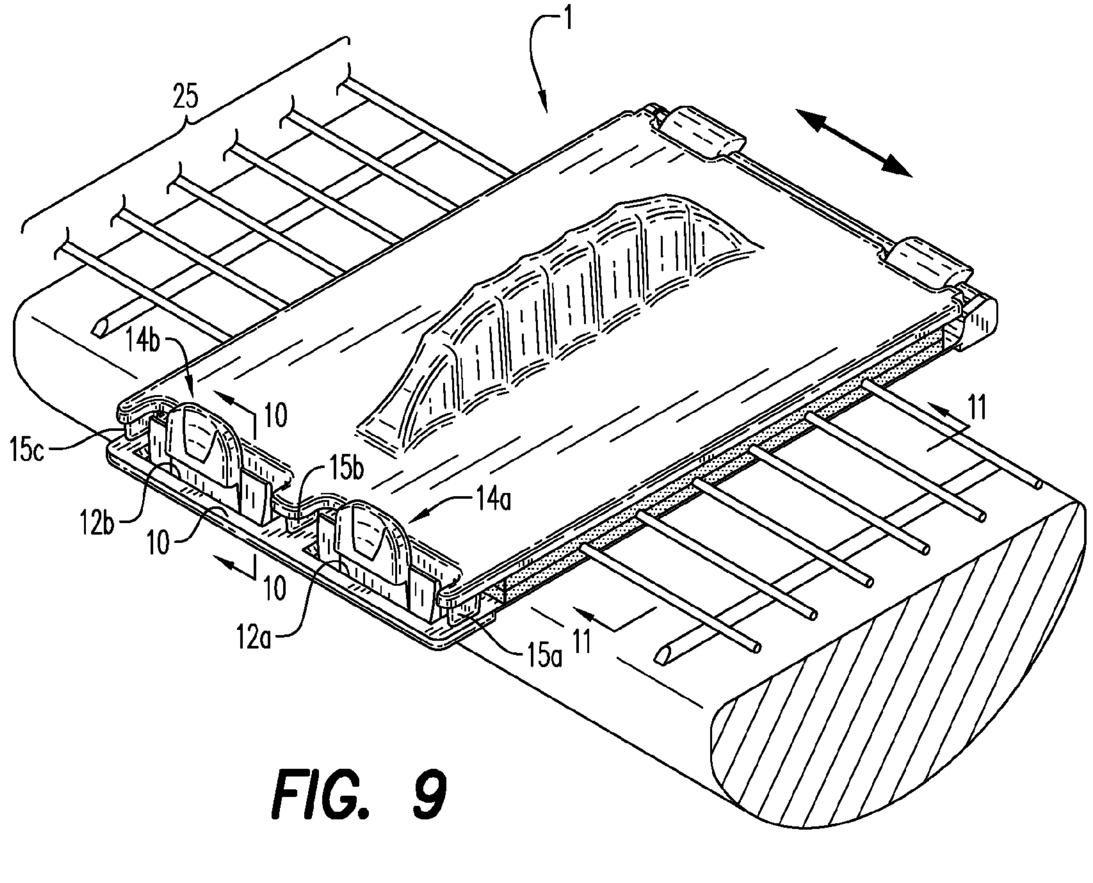
FIG. 9 is a top perspective view of a string cleaning apparatus during use according to some embodiments.

FIGS. 8 and 9 depict apparatus 1 after completion of the movement illustrated in FIG. 7. As shown in FIGS. 8 and 9, cleaning material 7 and cleaning material 9 are in contact with strings 25 and are disposed on substantially opposite sides of strings 25. Latches 14*a* and 14*b* engage openings 12*a* and 12*b*, and stops 15*a* through 15*c* engage first side 10 of second support 3.

Figure 10:
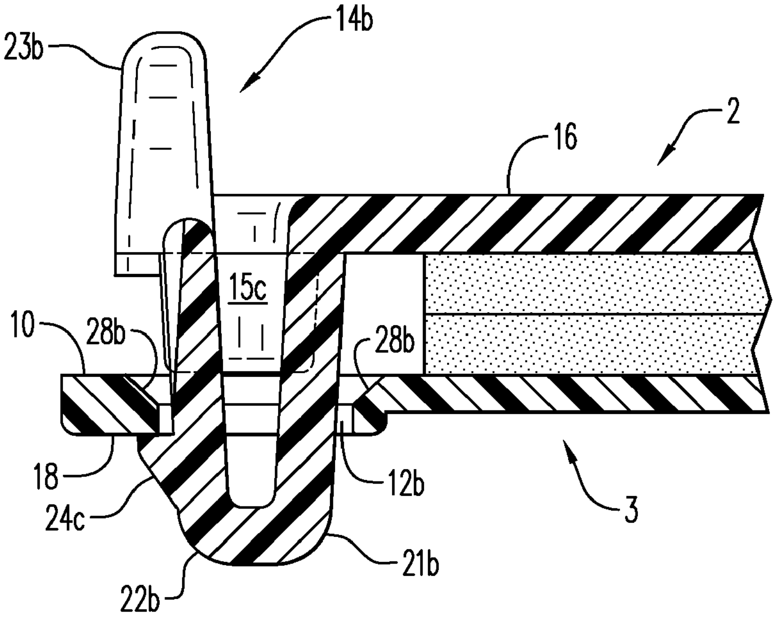
FIG. 10 is a close-up cross-sectional view of a latch engaged with an opening according to some embodiments.

FIG. 10 is a cross-sectional view to illustrate engagement of latch 14*b* with opening 12*b* according to some embodiments. Opening 12*b* is defined by beveled portion 28*b* of second support 3. As latch 14*b* enters opening 12*b*, one or both of legs 21*b* and 22*b* may press against and slide across beveled portion 28*b*. As latch 14*b* continues through opening 12*b*, projection 24*c* also presses against and slides across beveled portion 28. Beveled portion 28*b* may therefore assist in guiding latch 14*b* into opening 12*b*.

Beveled portion 28*b* may also assist in compressing legs 21*b* and 22*b* toward one another. In particular, the engagement of projection 24*c* with beveled portion 28*b* as latch 14*b* passes through opening 12*b* may bias leg 22*b* toward leg 21*b* and allow projection 24*c* to pass completely through opening 12*b*. Release element 23*b* may also or alternatively be manually pressed to bias leg 22*b* toward leg 21*b* during passage of projection 24*c* through opening 12*b*.

Projection 24*c* engages second side 18 of second support 3 once projection 24*c* has passed through opening 12*b*. FIG. 10 also shows stop 15*c* engaged with first side 10 of second support 3. Stop 15*c* (and stops 15*a* and 15*b*) may work in conjunction with projections 24*a* through 24*c* (as well as with the other projection on latch 14*b*) to resist excessive twisting of first support 2 and second support 3 relative to one another during use. In some embodiments, stop 15*c* does not contact first side 10 when projection 24*c* contacts second side 18. Rather, a small gap exists between stop 15*c* and first side 10 to allow projection 24*c* to be moved slightly away from second side 18 during engagement and disengagement of latch 14*b*.

To disengage latch 14*b* from opening 12*b*, release element 23*b* may be pressed to bias leg 22*b* toward leg 21*b* until projection 24*c* disengages from second side 18. In some embodiments, the extension of release element 23*b* past second side 16 of first support 3 may facilitate access to release element 23*b* and provide sufficient leverage to disengage projection 24*c* from second side 18. Support 2 may then be rotated away support 3 to remove latch 14*b* from opening 12*b*. Latch 14*a* may be similarly and simultaneously manipulated to ensure that projections 24*a* and 24*b* are also disengaged from second side 18 prior to rotation of first support 2 away from second support 3.

Returning to FIG. 9, apparatus 1 may be moved lengthwise across strings 25. Such motion may allow first cleaning material 7 and second cleaning material 9 to remove debris and fluids from strings 25. In some embodiments, the loops of materials 7 and 9 at least partially touch the sides of strings 25 when in the FIG. 9 position and, when moved, "pull" debris from strings 25. Apparatus 1 may be moved perpendicular to the direction of the arrow, and in any direction in between, in order to clean strings 25.

Cleaning material 7 and/or cleaning material 9 may be compressed to approximately 0.032 in when in the FIG. 9 position. Such compression, in conjunction with a thickness of second support 3, may allow apparatus 1 to clean portions of strings 25 which are located close to instrument neck 26 (e.g., portions adjacent to a "nut" of neck 26).

During movement as shown in FIG. 9, second support 3 may contact a fret 27 and thereby push strings 25 away from instrument neck 26. Such upward force may provide improved cleaning of portions of strings 25 which face instrument neck 26.

Figure 11:
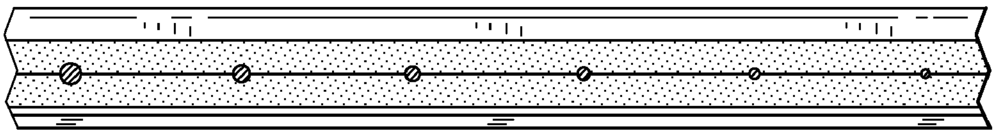
FIG. 11 is a close-up side elevational view of a portion of a string cleaning apparatus during use according to some embodiments.

A compressive force between first cleaning material 7 and second cleaning material 9 may vary based on distance from latches 14*a* and 14*b* according to some embodiments. As illustrated in FIG. 11, such an arrangement may provide an adequate force for cleaning smaller-diameter strings located away from latches 14*a* and 14*b* while avoiding the application of too much force on larger-diameter strings located closer to latches 14*a* and 14*b*.

The compressive force at each location along apparatus 1 may be controlled in several ways. According to some embodiments, a thickness of one or both of first support 2 and second support 3 may change along the length of apparatus 1 while maintaining the overall height of apparatus 1 when "closed" as shown in FIGS. 8 and 9. In some embodiments, a thickness of one or both of first cleaning material 7 and second cleaning material 9 differs along the length of apparatus 1, while again maintaining the overall height of apparatus 1 as shown in FIGS. 8 and 9.

According to some embodiments, a cleaning agent may be applied to one or both of first cleaning material 7 and second cleaning material 9 prior to engaging latches 14*a* and 14*b* with openings 12*a* and 12*b*. The cleaning agent may be a liquid and may be particularly suited to cleaning strings of the type to be cleaned. The cleaning agent may be non-water-based in order to prevent damage to instrument neck 27. The cleaning agent may be compatible with cleaning materials 7 and 9 and/or with an adhesive used to couple cleaning materials 7 and 9 to supports 2 and 3.

Some embodiments may provide one or more of: sufficient cleaning pressure on the strings, ease in placing cleaning material between the strings and an instrument, secure maintenance of cleaning material around the strings, resistance to skewing or twisting during use, and ease of disengaging the first support from the second support.

The several embodiments described herein are solely for the purpose of illustration. Embodiments may include any currently or hereafter-known versions of or substitutes for the elements described herein. Therefore, persons in the art will recognize from this description that other embodiments may be practiced with various modifications and alterations.

What is claimed is:

1. An apparatus comprising:

a first support;

a first cleaning material coupled to a first side of the first support;

a second support rotatably coupled to the first support at a first edge of the second support, the second support defining a first opening disposed adjacent to a second edge of the second support opposite the first edge, and a second opening disposed adjacent to the second edge of the second support;

a second cleaning material coupled to a first side of the second support;

a first latch integral with the first support, to engage the first opening of the second support, and comprising a projection to pass through the first opening, the projection to engage a second side of the second support in a case that the first latch engages the first opening of the second support;

a first stop coupled to the first side of first support to engage the first side of the second support in a case that the first latch engages the first opening of the second support;

a second latch integral with the first support, to engage the second opening of the second support, and comprising a second projection to pass through the second opening, the second projection to engage the second side of the second support in a case that the second latch engages the second opening of the second support; and a second stop coupled to the first side of first support to engage the first side of the second support in a case that the second latch engages the second opening of the second support.

2. An apparatus according to claim 1, wherein the first latch comprises:

a release element to compress the first latch and to allow the compressed first latch to disengage from the first opening.

3. An apparatus according to claim 2, wherein the release element extends past a second side of the first support.

4. An apparatus according to claim 3, further comprising:

a handle coupled to the second side of the first support.

5. An apparatus according to claim 1, further comprising:

the second stop coupled to the first side of first support engages the first side of the second support adjacent to a central portion of the second edge of the second support in a case that the first latch engages the first opening of the second support; and a third stop coupled to the first side of first support to engage the first side of the second support adjacent to a first end of the second edge of the second support in a case that the first latch engages the first opening of the second support, wherein the first stop is to engage the first side of the second support adjacent to a second end of the second edge of the second support in a case that the first latch engages the first opening of the second support.

6. An apparatus according to claim 1, wherein the first latch and the second latch are disposed between the first stop and the second stop.

7. An apparatus according to claim 1, wherein the first opening is defined by at least one beveled portion of the second support.

8. An apparatus according to claim 1, wherein the second support comprises:

a third beveled edge and a fourth beveled edge opposite the third beveled edge, a first bevel extending from the third beveled edge toward a central portion of the second side of the second support; and a second bevel extending from the fourth beveled edge toward the central portion of the second side of the second support.

9. An apparatus according to claim 1, wherein the second support is denser than the first support.

10. An apparatus according to claim 1, wherein the first support comprises anti-skew ribs.

* * * * *